United States Patent
Matsui (10) Patent No.: US 7,286,299 B2
(45) Date of Patent: Oct. 23, 2007

(54) ZOOM LENS AND IMAGE SENSING APPARATUS

(75) Inventor: Takumi Matsui, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 123 days.

(21) Appl. No.: 11/208,264

(22) Filed: Aug. 19, 2005

(65) Prior Publication Data

US 2006/0056052 A1    Mar. 16, 2006

(30) Foreign Application Priority Data

Aug. 25, 2004  (JP) .............................. 2004-245143

(51) Int. Cl.
*G02B 15/14* (2006.01)
*G02B 13/16* (2006.01)

(52) U.S. Cl. ...................... 359/687; 348/335; 359/684

(58) Field of Classification Search ................ 348/335; 359/684, 686, 687
See application file for complete search history.

(56) References Cited

U.S. PATENT DOCUMENTS 6,754,446 B2 *  6/2004  Hagimori et al. ............. 396/72
7,068,440 B1 *  6/2006  Nakatani et al. ............. 359/676
2004/0095503 A1 *  5/2004  Iwasawa et al. ............. 348/344

FOREIGN PATENT DOCUMENTS

| JP | 2000-131610 |   | 5/2000 |
| JP | 2005195757 A | * | 7/2005 |

* cited by examiner

*Primary Examiner*—David N. Spector
(74) *Attorney, Agent, or Firm*—Cohen Pontani Lieberman & Pavane LLP

(57) ABSTRACT

A zoom lens sequentially includes, along an optical axis from the object (to be imaged) side, a first lens group which has positive refracting power and is always fixed at a position in the optical axis direction in zooming and focusing, a second lens group having negative refracting power, a third lens group having positive refracting power, and a fourth lens group having positive refracting power. Zooming is performed by moving at least the second lens group and fourth lens group. Focusing is performed by moving at least the fourth lens group. The first lens group includes an optical element having an effect of bending the optical path of a light beam and satisfies the following conditional expression:

$$2.0 < f1/fw < 4.5$$

where f1 is the focal length of the first lens group and fw is the focal length of the zoom lens at the wide-angle end.

14 Claims, 6 Drawing Sheets

ZOOM LENS AND IMAGE SENSING APPARATUS

This application is based on and claims the priority under 35 U.S.C. § 119 from the Japanese Patent Application No. 2004-245143 filed in Japan on Aug. 25, 2004, the entire content of which is incorporated herein by reference.

BACKGROUND OF THE INVENTION

1. Field of the Invention

The present invention relates to a zoom lens and an image sensing apparatus using the same and, more particularly, to a zoom lens for forming an optical image on a solid-state image sensing device such as a CCD type image sensor or CMOS type image sensor, and an image sensing apparatus using the same.

2. Description of the Related Art

For compact digital still cameras and video cameras equipped with compact image sensing units comprising solid-state image sensing devices such as CCD (Charge Coupled Device) type image sensors and CMOS (Complementary Metal-Oxide Semiconductor) type image sensors, demands have arisen for zoom lenses having higher imaging performance with an increase in the pixel density of solid-state image sensing devices. In addition, the zoom lenses of compact image sensing apparatuses have been required to be smaller.

As disclosed in, for example, Japanese Unexamined Patent Publication No. 2000-131610 (patent reference 1), there is available a small zoom lens for a compact image sensing apparatus, which is comprised of a first lens group having positive refracting power, a second lens group having negative refracting power, a third lens group having positive refracting power, and a fourth lens group having positive refracting power, and is designed to achieve a reduction in the size of the zoom lens in the thickness direction by placing a prism for bending the optical path in the first lens group.

The zoom lens disclosed in patent reference 1 has, however, a long total length along the optical axis as compared with the focal length, and is not suitable for a compact image sensing apparatus.

SUMMARY OF THE INVENTION

The present invention has been made in consideration of the above problem, and can provide a small zoom lens which can ensure a sufficiently high magnification ratio while having high imaging performance, and an image sensing apparatus using the zoom lens.

A zoom lens according to the present invention comprises a plurality of lens groups. In this zoom lens, zooming and focusing (focus adjustment) are performed by moving at least one or two lens groups along the optical axis. In addition, the first lens group located nearest to the object (to be imaged) side includes an optical element having an effect of bending the optical path, and satisfies the following conditional expression:

$$2.0 < f1/fw < 4.5 \quad (1)$$

where f1 is the focal length of the first lens group and fw is the focal length of the zoom lens at the wide-angle end.

According to the present invention, there can be provided a small zoom lens which has high imaging performance suitable to be used for a digital still camera, a video camera, or the like which uses a high-pixel-density solid-state image sensing device, and can ensure a sufficiently high magnification ratio of about 3×, and an image sensing apparatus using the zoom lens.

The above and many other features and advantages of the present invention will become manifest to those skilled in the art upon making reference to the following detailed description and accompanying drawings in which preferred embodiments incorporated the principle of the present invention are shown by way of illustrative examples.

BRIEF DESCRIPTION OF THE DRAWINGS

Embodiments will now be described, by way of example only, with reference to the accompanying drawings which are meant to be exemplary, not limiting, and wherein like element are numbered alike in several Figures, in which.

DETAILED DESCRIPTION OF THE PREFERRED EMBODIMENTS

The embodiments of the zoom lens of the present invention will be described below. However, the present invention is not limited to them. In each embodiment described above, in an orthogonal coordinate system in which a surface vertex is set as an origin, and the optical axis direction is set as the X-axis, letting C be a vertex curvature, K be a cone constant, and $A_4$, $A_6$, $A_8$, $A_{10}$, and $A_{12}$ be aspherical surface coefficients, an aspherical surface shape is represented by expression (a) given below. Assume that in the following table, the power of 10 (e.g., $2.5 \times 10^{-3}$) is represented by E (e.g., 2.5E-3).

$$X = \frac{Ch^2}{1 + \sqrt{1 - (1+K)C^2h^2}} + A_4 h^4 + A_6 h^6 + A_8 h^8 + A_{10} h^{10} + A_{12} h^{12} \quad (a)$$

$$\text{for } h = \sqrt{Y^2 + Z^2}$$

First Embodiment

Figure 1:
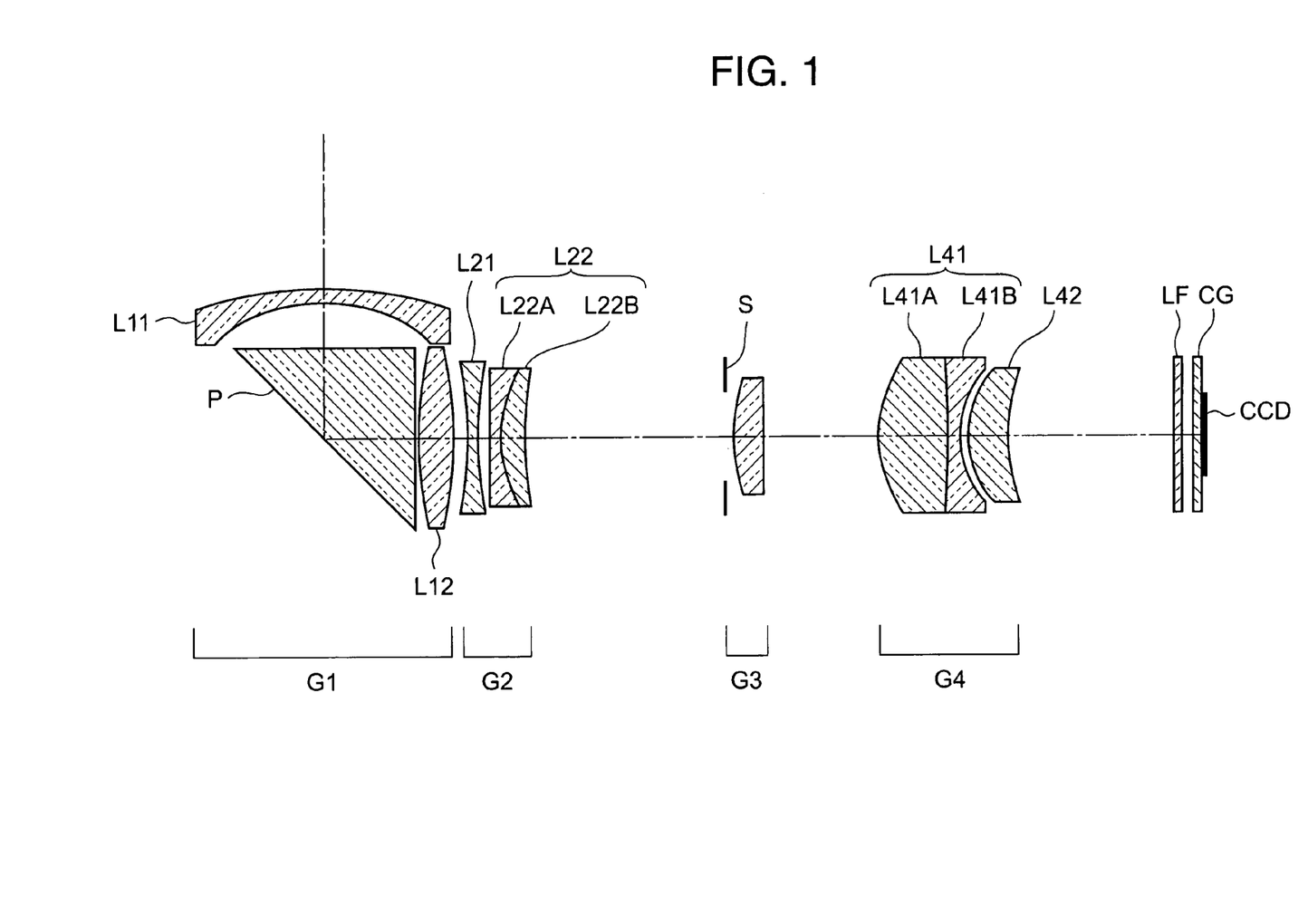
FIG. 1 is a view showing the schematic arrangement of an image sensing apparatus equipped with a zoom lens according to the first embodiment.
Figure 2A:
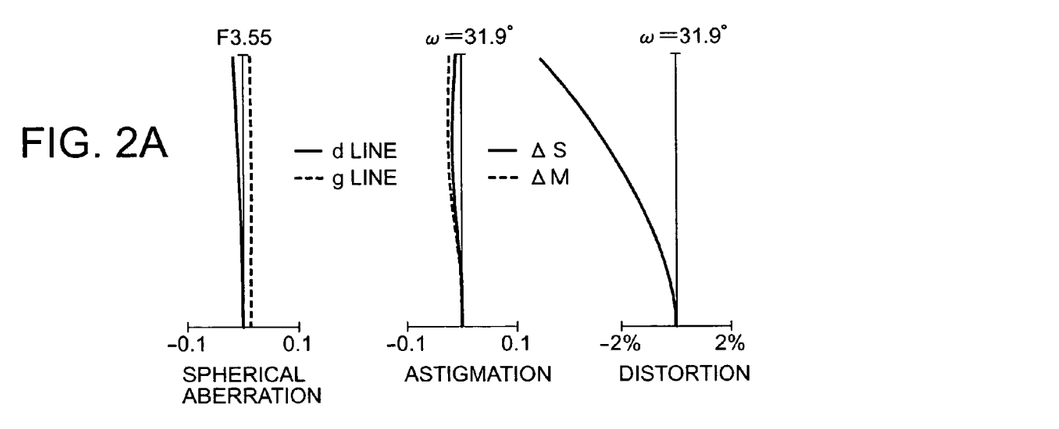
FIGS. 2A to 2C are aberration diagrams showing spherical aberration, astigmatism, and distortion according to the first embodiment.
Figure 2B:
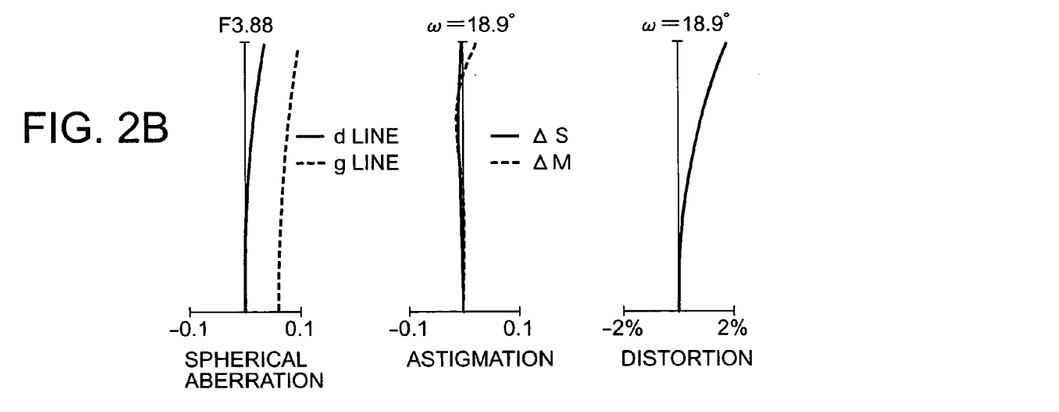
Figure 2C:
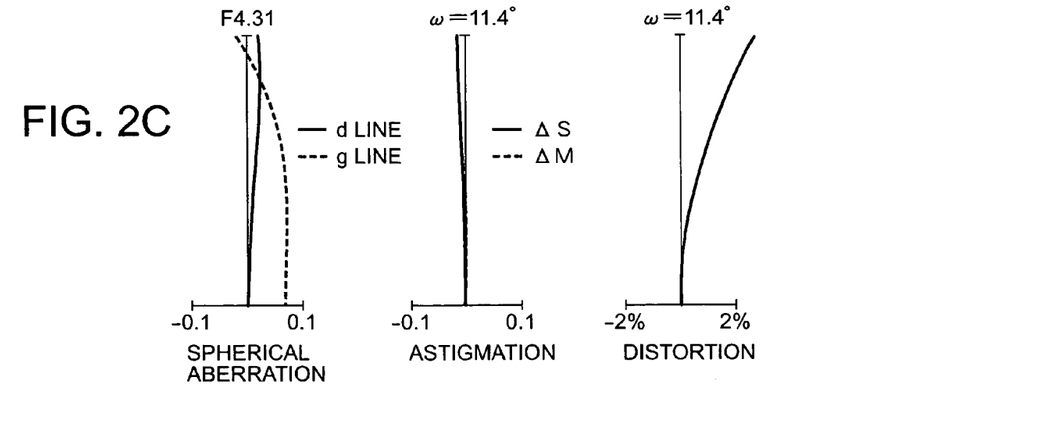

FIG. 1 is a view showing the schematic arrangement of an image sensing apparatus equipped with a zoom lens according to the first embodiment. FIGS. 2A to 2C are aberration diagrams showing spherical aberration, astigmatism, and distortion in the first embodiment. FIG. 2A is an aberration diagram with a focal length of 6.28 mm. FIG. 2B is an aberration diagram with a focal length of 10.59 mm. FIG. 2C is an aberration diagram with a focal length of 17.90 mm. Table 1 shows the lens data of zoom lenses according to the first embodiment. The following are the specifications of these zoom lenses:

focal length: f=6.28 mm to 10.59 mm to 17.90 mm angle of view: 2ω=63.8° to 37.8° to 22.8°

TABLE 1

|    | r        | d    | nd   | vd   |
|----|----------|------|------|------|
| 1  | 22.402   | 0.60 | 1.85 | 23.8 |
| 2  | 8.158    | 2.21 |      |      |
| 3  | ∞        | 4.40 | 1.90 | 31.3 |
| 4  | ∞        | 4.40 | 1.90 | 31.3 |
| 5  | ∞        | 0.25 |      |      |
| 6  | 19.281   | 1.70 | 1.72 | 50.2 |
| 7  | −17.962  | A    |      |      |
| 8  | −25.695  | 0.54 | 1.77 | 49.6 |
| 9  | 18.765   | 0.52 |      |      |
| 10 | −313.780 | 0.52 | 1.77 | 49.6 |
| 11 | 6.309    | 1.20 | 1.85 | 23.8 |
| 12 | 19.309   | B    |      |      |
| 13 | ∞        | 0.50 | 1.59 | 61.2 |
| 14 | 9.874    | 1.35 |      |      |
| 15 | 40.147   | C    |      |      |
| 16 | 6.624    | 3.30 | 1.77 | 49.6 |
| 17 | −94.377  | 0.68 | 1.81 | 25.4 |
| 18 | 4.913    | 0.35 |      |      |
| 19 | 4.967    | 2.00 | 1.53 | 56.6 |
| 20 | 21.919   | D    |      |      |
| 21 | ∞        | 0.42 | 1.55 | 67.0 |
| 22 | ∞        | 0.50 |      |      |
| 23 | ∞        | 0.50 | 1.52 | 64.1 |
| 24 | ∞        |      |      |      |

[Aspherical Surface Coefficient]

14th Surface $K = 0.0$
$A4 = -9.1918E-05$
$A6 = -1.0450E-07$
$A8 = 0.0$
$A10 = 0.0$
$A12 = 0.0$ 19th Surface $K = 0.0$
$A4 = -3.1583E-05$
$A6 = 2.1705E-06$
$A8 = 0.0$
$A10 = 0.0$
$A12 = 0.0$ 20th Surface $K = 0.0$
$A4 = 1.7423E-03$
$A6 = 3.4734E-05$
$A8 = 2.7981E-06$
$A10 = 0.0$
$A12 = 0.0$

| Focal Length | A    | B    | C    | D     |
|--------------|------|------|------|-------|
| 6.28         | 0.65 | 9.32 | 5.81 | 8.22  |
| 10.59        | 5.43 | 4.54 | 3.83 | 10.20 |
| 17.90        | 9.51 | 0.47 | 1.90 | 12.13 |

As shown in FIG. 1, the zoom lens according to the first embodiment sequentially includes, along the optical axis from the object side, a first lens group G1 having positive refracting power, a second lens group G2 having negative refracting power, an aperture stop S, a third lens group G3 having positive refracting power, and a fourth lens group G4 having positive refracting power. In zooming from the wide-angle end to the telephoto end, the positions of the first lens group G1, third lens group G3, and aperture stop S on the optical axis remain unchanged (the positions in the optical axis direction are always fixed). The second lens group G2 comprises a negative lens L21 and a cemented lens L22 formed by cementing a negative lens L22A and positive lens 22B. The fourth lens group G4 comprises a cemented lens L41 formed by cementing a positive lens L41A and negative lens L41B, and a plastic lens L42 having the meniscus shape with the concave aspherical surface facing the image side in the optical axis direction. The first lens group G1 sequentially includes, from the object side, a negative lens L11 (to be also referred to as a 1-1st lens) having negative refracting power, a prism P forming a reflecting optical element for bending an optical path through 90°, and a positive lens L12 (to be also referred to as a 1-2nd lens) having positive refracting power. Note that a low-pass filter LF (an infrared cut filter may alternatively be used), cover glass CG, and solid-state image sensing device CCD are sequentially arranged on the image side of the fourth lens group G4 from the object side. An image sensing apparatus is comprised of these components and the zoom lens.

In zooming from the wide-angle end to the telephoto end, the second lens group G2 moves to increase the distance between the first lens group G1 and the second lens group G2, and the fourth lens group G4 moves to decrease the distance between the third lens group G3 and the fourth lens group G4. In focusing operation, at least the fourth lens group G4 moves to the object side in the optical axis direction, but the positions of the first lens group G1 and third lens group G3 on the optical axis remain unchanged.

In the first embodiment, the fourth lens group G4 is comprised of the cemented lens L41 including the positive lens L41A and negative lens L41B, and the plastic lens L42 having a meniscus shape with a concave aspherical surface facing the image side in the optical axis direction. This makes it possible to effectively correct chromatic aberration, curvature of field, and distortion, in particular.

Second Embodiment

Figure 3:
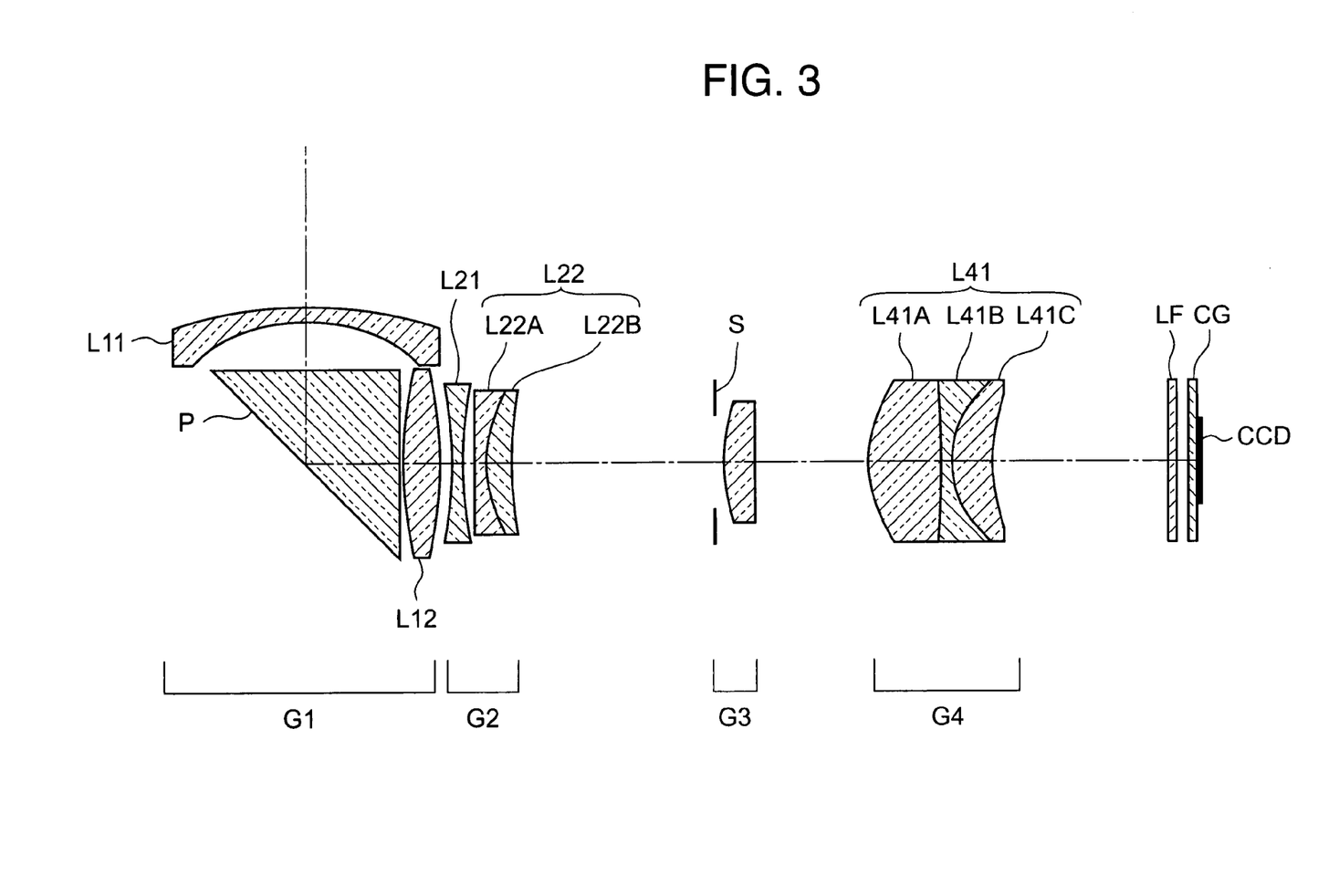
FIG. 3 is a view showing the schematic arrangement of an image sensing apparatus equipped with a zoom lens according to the second embodiment.
Figure 4A:
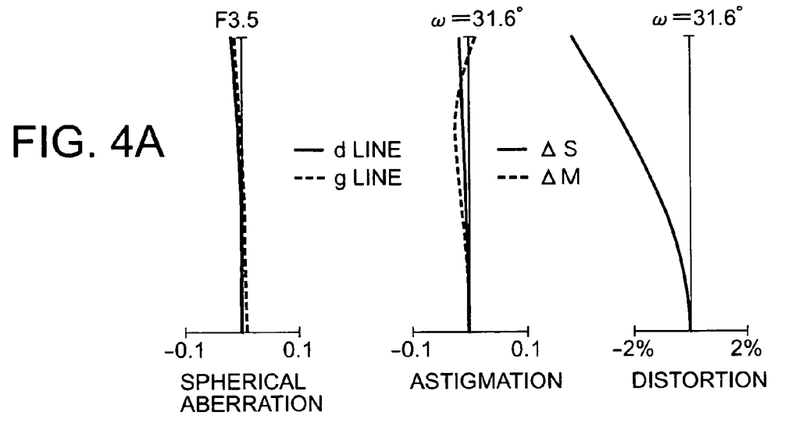
FIGS. 4A to 4C are aberration diagrams showing spherical aberration, astigmatism, and distortion according to the second embodiment.
Figure 4B:
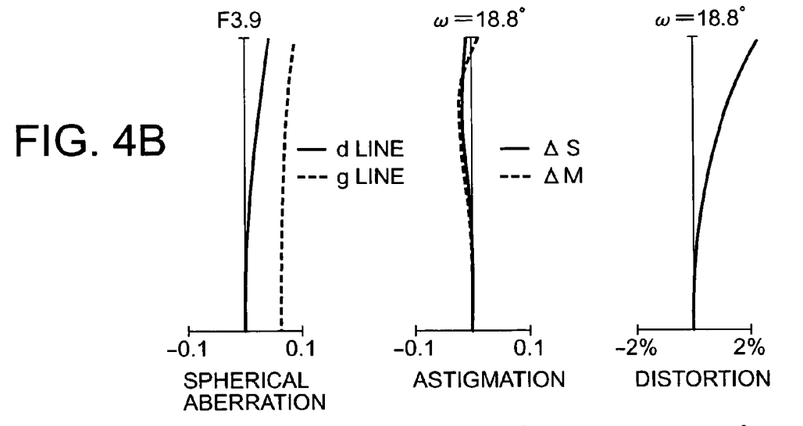
Figure 4C:
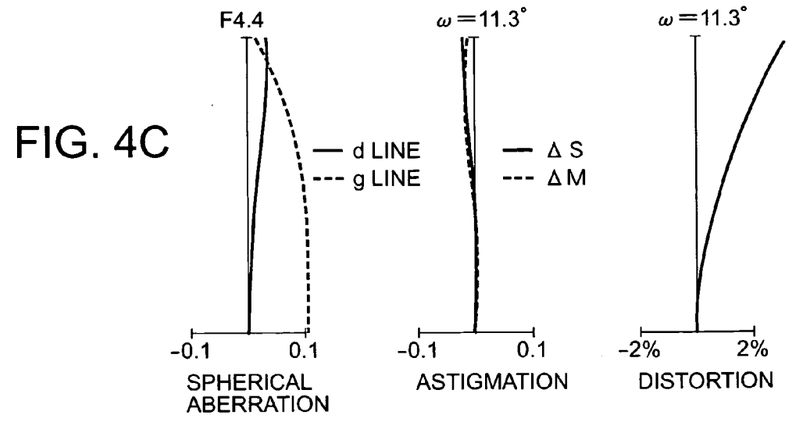

FIG. 3 is a view showing the schematic arrangement of an image sensing apparatus equipped with a zoom lens according to the second embodiment. FIGS. 4A to 4C are aberration diagrams showing spherical aberration, astigmatism, and distortion in the second embodiment. FIG. 4A is an aberration diagram with a focal length of 6.28 mm. FIG. 4B is an aberration diagram with a focal length of 10.60 mm. FIG. 4C is an aberration diagram with a focal length of 17.90 mm. Table 2 shows the lens data of zoom lenses according to the second embodiment. The following are the specifications of these zoom lenses:

focal length: f=6.28 mm to 10.60 mm to 17.90 mm angle of view: 2ω=63.2° to 37.6° to 22.6°

TABLE 2

|   | r       | d    | nd   | vd   |
|---|---------|------|------|------|
| 1 | 28.560  | 0.60 | 1.85 | 23.8 |
| 2 | 8.757   | 2.19 |      |      |
| 3 | ∞       | 4.40 | 1.90 | 31.3 |
| 4 | ∞       | 4.40 | 1.90 | 31.3 |
| 5 | ∞       | 0.25 |      |      |
| 6 | 20.611  | 1.70 | 1.77 | 50.2 |
| 7 | −19.763 | A    |      |      |
| 8 | −32.423 | 0.54 | 1.77 | 49.6 |
| 9 | 19.454  | 0.52 |      |      |

TABLE 2-continued

| | | | | |
|---|---|---|---|---|
| 10 | −808.339 | 0.52 | 1.77 | 49.6 |
| 11 | 6.207 | 1.20 | 1.85 | 23.8 |
| 12 | 16.889 | B | | |
| 13 | ∞ | 0.50 | 1.59 | 61.2 |
| 14 | 8.490 | 1.35 | | |
| 15 | 23.065 | C | | |
| 16 | 6.635 | 3.30 | 1.74 | 45.0 |
| 17 | −46.052 | 0.68 | 1.81 | 25.4 |
| 18 | 5.000 | 2.00 | 1.59 | 61.2 |
| 19 | 19.985 | D | | |
| 20 | ∞ | 0.42 | 1.55 | 67.0 |
| 21 | ∞ | 0.50 | | |
| 22 | ∞ | 0.50 | 1.52 | 64.1 |
| 23 | ∞ | | | |

[Aspherical Surface Coefficient]

13th Surface $K = 0.0$
$A4 = -1.3627E-04$
$A6 = -8.4802E-08$
$A8 = 0.0$
$A10 = 0.0$
$A12 = 0.0$ 18th Surface $K = 0.0$
$A4 = -1.7500E-03$
$A6 = 3.6750E-05$
$A8 = 2.6743E-06$
$A10 = 0.0$
$A12 = 0.0$

| Focal Length | A | B | C | D |
|---|---|---|---|---|
| 6.28 | 0.61 | 9.88 | 6.09 | 8.24 |
| 10.60 | 5.48 | 5.02 | 4.01 | 10.32 |
| 17.90 | 9.50 | 0.99 | 1.86 | 12.47 |

As shown in FIG. 3, the zoom lens according to the second embodiment sequentially includes, along the optical axis from the object side, a first lens group G1 having positive refracting power, a second lens group G2 having negative refracting power, an aperture stop S, a third lens group G3 having positive refracting power, and a fourth lens group G4 having positive refracting power. In zooming from the wide-angle end to the telephoto end, the positions of the first lens group G1, third lens group G3, and aperture stop S on the optical axis remain unchanged. The second lens group G2 comprises a negative lens L21 and a cemented lens L22 formed by cementing a negative lens L22A and positive lens 22B. The fourth lens group G4 comprises a cemented lens L41 formed by sequentially cementing a positive lens L41A, negative lens L41B, and positive lens L41C along the optical axis from the object side. The first lens group G1 sequentially includes, from the object side, a negative lens L11 having negative refracting power, a prism P forming a reflecting optical element for bending an optical path through 90°, and a positive lens L12 having positive refracting power. Note that a low-pass filter LF (an infrared cut filter may alternatively be used), cover glass CG, and solid-state image sensing device CCD are sequentially arranged on the image side of the fourth lens group G4 from the object side. An image sensing apparatus is comprised of these components and the zoom lens.

In zooming from the wide-angle end to the telephoto end, the second lens group G2 moves to increase the distance between the first lens group G1 and the second lens group G2, and the fourth lens group G4 moves to decrease the distance between the third lens group G3 and the fourth lens group G4. In focusing operation, at least the fourth lens group G4 moves to the object side in the optical axis direction, but the positions of the first lens group G1 and third lens group G3 on the optical axis remain unchanged.

In the second embodiment, the fourth lens group G4 is comprised of the cemented lens L41 including the positive lens L41A and negative lens L41B. Since the respective lenses in the fourth lens group G4 are bonded, the eccentricity error in a direction perpendicular to the optical axis can be reduced. In addition, forming the fourth lens group G4 as a single lens element makes it possible to realize an arrangement which can be easily assembled and is suitable for mass production.

Third Embodiment

Figure 5:
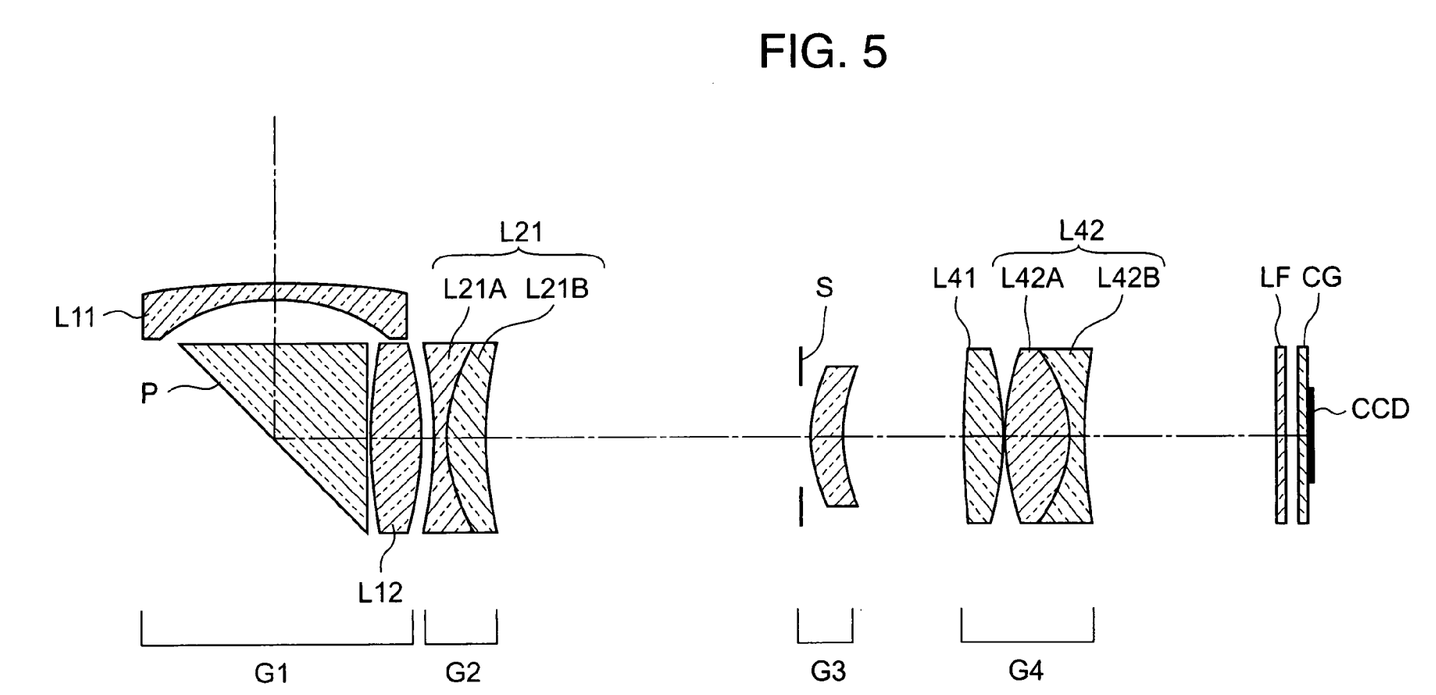
FIG. 5 is a view showing the schematic arrangement of an image sensing apparatus equipped with a zoom lens according to the third embodiment.
Figure 6A:
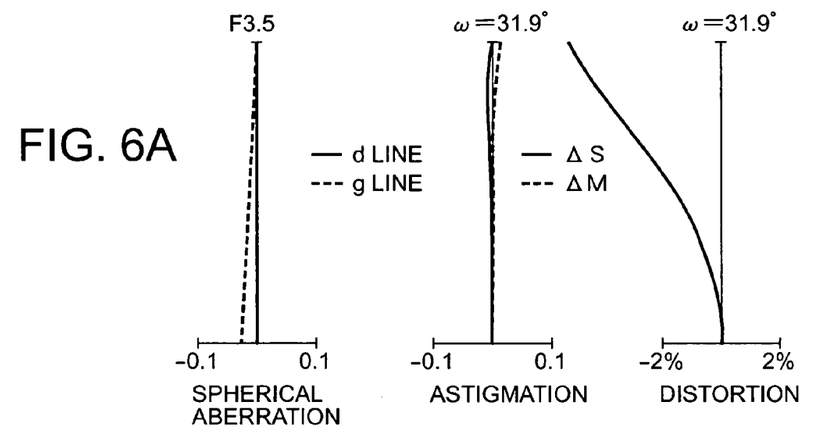
FIGS. 6A to 6C are aberration diagrams showing spherical aberration, astigmatism, and distortion according to the third embodiment.
Figure 6B:
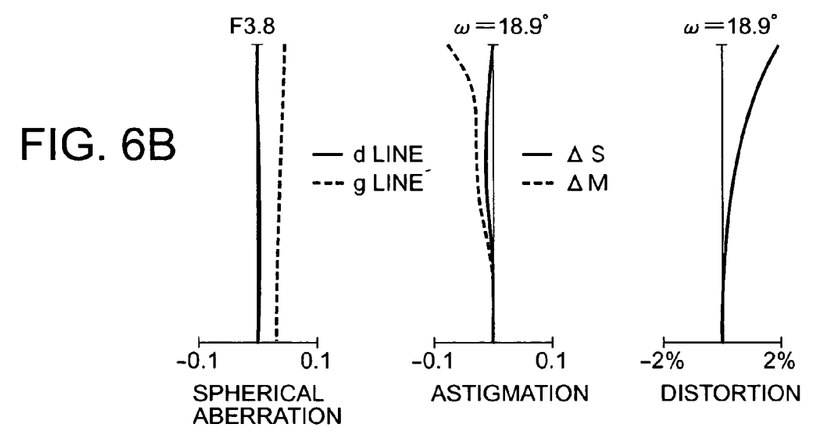
Figure 6C:
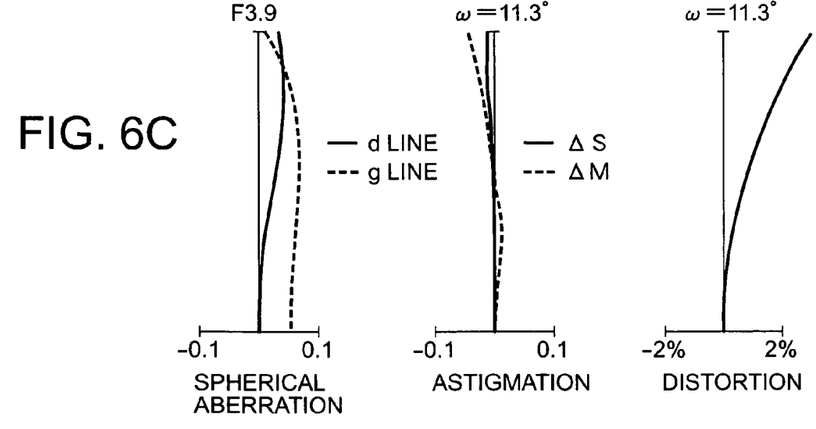

FIG. 5 is a view showing the schematic arrangement of an image sensing apparatus equipped with a zoom lens according to the third embodiment. FIGS. 6A to 6C are aberration diagrams showing spherical aberration, astigmatism, and distortion in the third embodiment. FIG. 6A is an aberration diagram with a focal length of 6.30 mm. FIG. 6B is an aberration diagram with a focal length of 10.60 mm. FIG. 6C is an aberration diagram with a focal length of 17.90 mm. Table 3 shows the lens data of zoom lenses according to the third embodiment. The following are the specifications of these zoom lenses:

focal length: f=6.30 mm to 10.60 mm to 17.90 mm
angle of view: 2ω=63.2° to 37.6° to 22.6°

TABLE 3

| | r | d | nd | νd |
|---|---|---|---|---|
| 1 | 51.267 | 0.60 | 1.85 | 23.8 |
| 2 | 8.599 | 2.10 | | |
| 3 | ∞ | 4.40 | 1.90 | 31.3 |
| 4 | ∞ | 4.40 | 1.90 | 31.3 |
| 5 | ∞ | 0.25 | | |
| 6 | 31.311 | 2.30 | 1.77 | 50.2 |
| 7 | −14.973 | A | | |
| 8 | −21.422 | 0.62 | 1.77 | 50.2 |
| 9 | 7.465 | 1.85 | 1.85 | 23.8 |
| 10 | 17.306 | B | | |
| 11 | ∞ | 0.50 | | |
| 12 | 5.616 | 1.50 | 1.70 | 55.5 |
| 13 | 7.290 | C | | |
| 14 | 92.578 | 1.85 | 1.73 | 54.7 |
| 15 | −11.760 | 0.10 | | |
| 16 | 11.094 | 3.00 | 1.53 | 48.9 |
| 17 | −5.931 | 0.70 | 1.81 | 25.4 |
| 18 | 21.152 | D | | |
| 19 | ∞ | 0.42 | 1.55 | 67.0 |
| 20 | ∞ | 0.50 | | |
| 21 | ∞ | 0.50 | 1.52 | 64.1 |
| 22 | ∞ | | | |

[Aspherical Surface Coefficient]

Sixth Surface $K = 0.0$
$A4 = 8.7636E-06$
$A6 = -5.4246E-08$
$A8 = -1.7299E-09$
$A10 = 0.0$
$A12 = 0.0$ Seventh Surface $K = 0.0$
$A4 = 6.0143E-05$
$A6 = -3.0750E-07$
$A8 = 0.0$
$A10 = 0.0$ TABLE 3-continued A12 = 0.0
11th Surface K = 0.0
A4 = 3.1836E-04
A6 = -6.4692E-06
A8 = -3.8495E-07
A10 = 0.0
A12 = 0.0
12th Surface

K = 0.0
A4 = 3.1836E-04
A6 = -6.4692E-06
A8 = 0.0
A10 = 0.0
A12 = 0.0

| Focal Length | A | B | C | D |
|---|---|---|---|---|
| 6.30 | 0.57 | 14.76 | 5.73 | 9.17 |
| 10.60 | 7.65 | 7.69 | 4.35 | 10.55 |
| 17.90 | 14.32 | 1.01 | 3.77 | 11.14 |

As shown in FIG. 5, the zoom lens according to the third embodiment sequentially includes, along the optical axis from the object, side, a first lens group G1 having positive refracting power, a second lens group G2 having negative refracting power, an aperture stop S, a third lens group G3 having positive refracting power, and a fourth lens group G4 having positive refracting power. In zooming from the wide-angle end to the telephoto end, the positions of the first lens group G1, third lens group G3, and aperture stop S on the optical axis remain unchanged. The second lens group G2 comprises only a cemented lens L21 formed by cementing a negative lens L21A and positive lens 21B. The fourth lens group G4 sequentially comprises, along the optical axis from the object side, a positive lens L41 and a cemented lens L42 formed by cementing a positive lens L42A and negative lens L42B. The first lens group G1 sequentially includes, from the object side, a negative lens L11 having negative refracting power, a prism P forming a reflecting optical element for bending an optical path through 90°, and a positive lens L12 having positive refracting power. Note that a low-pass filter LF (an infrared cut filter may alternatively be used), cover glass CG, and solid-state image sensing device CCD are sequentially arranged on the image side of the fourth lens group G4 from the object side. An image sensing apparatus is comprised of these components and the zoom lens.

In zooming from the wide-angle end to the telephoto end, the second lens group G2 moves to increase the distance between the first lens group G1 and the second lens group G2, and the fourth lens group G4 moves to decrease the distance between the third lens group G3 and the fourth lens group G4. In focusing operation, at least the fourth lens group G4 moves to the object side in the optical axis direction, but the positions of the first lens group G1 and third lens group G3 on the optical axis remain unchanged.

In the third embodiment, since the second lens group G2 is comprised of only the cemented lens L21 including the negative lens L21A and positive lens L21B, the moving amount of the second lens group G2 in zooming operation can be increased. This allows the second lens group G2 to have weaker refracting power, and hence makes it possible to suppress the occurrence of aberration in the second lens group G2.

In addition, since the fourth lens group G4 is comprised of the positive lens L41 and the cemented lens L42 formed by sequentially cementing positive lens L42A and negative lens L42B along the optical axis from the object side, positive refracting power can be shared by the two positive lenses L41 and L42A. This makes it possible to reduce the occurrence of aberrations such as spherical aberration, coma, and curvature of field.

Table 4 shows a list of values corresponding to conditional expressions (1) to (3) in the above three embodiments.

Conditional expression (1) represents the relationship between a focal length f1 of the first lens group and the focal length of the zoom lens at the wide-angle end and is set as follows:

$$2.0 < f1/fw < 4.5 \tag{1}$$

Conditional expression (2) represents the relationship between a focal length |f1-1| of the 1-1st lens of the first lens group and the focal length of the zoom lens at the wide-angle end and is set as follows:

$$1.1 < |f11|/fw < 5.0 \tag{2}$$

Conditional expression (3) represents, when the reflecting optical element is a prism, the refractive index of the prism with respect to a d line and is set as follows.

$$ndp > 1.6$$

TABLE 4

| | Conditional Expression (1) f1/fw | Conditional Expression (2) |f11|/fw | Conditional Expression (3) ndp |
|---|---|---|---|
| First Embodiment | 3.34 | 2.78 | 1.90 |
| Second Embodiment | 3.48 | 2.40 | 1.90 |
| Third Embodiment | 3.91 | 1.95 | 1.90 |

Note that each embodiment described above is designed to bend the optical path through 90° in the same direction as the long side direction of the solid-state image sensing device by using the prism for bending the optical path. However, each embodiment may be designed to bend the optical axis in the same direction as the short side direction of the sold-state image sensing device. Bending the optical path in the short side direction is advantageous in realizing a small zoom lens because the size of the prism can be reduced. Bending the optical path in the short side direction inverts an image on the image plane only laterally. Bending the optical path in the long side direction inverts an image on the image plane only vertically. In general, when a CCD is used as a solid-state image sensing device, bending the optical path in the short side direction is equivalent to bending the optical path on a vertical line. This makes it necessary to use a frame memory or perform frame storage. In contrast to this, bending the optical path in the long side direction makes it necessary to perform line storage and inverse read using a line memory. Therefore, bending the optical path in the long side direction has a merit of reducing the requirements for hardware for inversion.

In this specification, a "plastic lens" includes a lens which is formed from a material obtained by dispersing small-diameter particles in a plastic material serving as a base material, and has a plastic volume ratio of ½ or more, and also includes a lens whose surface is coated to prevent reflection or increase surface hardness.

The three embodiments of the present invention have been described above. However, the present invention should not be interpreted as being limited to the above embodiments. Obviously, the present invention can be changed and modified as needed. Although the zoom lens of the present invention is preferably mounted on digital still cameras, video cameras, and the like, they can be used for other applications such as cameras for portable terminal equipment such as cellular phone sets and PDAs.

The present invention has the following forms. Obviously, however, the present invention is not limited to them.

According to the first aspect, there is provided a zoom lens which sequentially comprises, along the optical axis, from the object (to be imaged) side, a first lens group having positive refracting power and having its position always fixed at a position in the optical axis direction in zooming and focusing, a second lens group having negative refracting power, a third lens group having positive refracting power, and a fourth lens group having positive refracting power, perform zooming by moving at least the second lens group and fourth lens group, and performs focusing by moving at least the fourth lens group, with the first lens group including an optical element having an effect of bending the optical path of a light beam and satisfying the following conditional expression:

$$2.0 < f1/fw < 4.5 \quad (1)$$

where f1 is the focal length of the first lens group and fw is the focal length of the zoom lens at the wide-angle end.

Conditional expression (1) is an expression which defines the range of the ratio between the focal length of the first lens group and the focal length of the zoom lens at the wide-angle end. Setting f1/fw to a value exceeding the lower limit of conditional expression (1) prevents the refracting power of the first lens group from becoming excessively strong and makes it possible to suppress the occurrence of aberration in the first lens group. Setting f1/fw to a value smaller than upper limit of conditional expression (1) increases the refracting power of the first lens group and makes it possible to decrease the moving amount of the second lens group serving as a magnification changing group and hence decrease the total length of the zoom lens.

The range defined by conditional expression (1') given below is preferably satisfied because the above effect is enhanced:

$$3.0 < f1/fw < 4.2 \quad (1')$$

According to the second aspect, in the zoom lens according to the first aspect, the position of the third lens group in the optical axis direction is always fixed in zooming and focusing.

Always fixing the position of the third lens group on the optical axis at a position in the optical axis direction in zooming and focusing makes it possible to simplify the driving unit of the image sensing apparatus equipped with the zoom lens, thereby achieving reductions in the size and weight of the image sensing apparatus.

According to the third aspect, in the zoom lens described in the first or second aspect, the first lens group sequentially comprises, along the optical axis from the object (to be imaged) side, the 1-1st lens having negative refracting power, the reflecting optical element for bending the optical path, and the 1-2nd lens having positive refracting power, and satisfies the following conditional expression:

$$1.1 < |f11/fw| < 5.0 \quad (2)$$

where f11 is the focal length of the 1-1st lens and fw is the focal length of the zoom lens at the wide-angle end.

Conditional expression (2) is an expression which defines the range of the focal length of the 1-1st lens. Setting |f11/fw| to a value exceeding the lower limit of conditional expression (2) makes it possible to prevent the occurrence of distortion in the 1-1st lens. Setting |f11/fw| to a value smaller than upper limit of conditional expression (2) makes it possible to decrease the diameter of a light beam striking the reflecting optical element and hence to decrease the size of the reflecting optical element for bending the optical path. Therefore, the thickness of the zoom lens in the thickness direction can be decreased.

The range defined by conditional expression (2') given below is preferably satisfied because the above effect is enhanced:

$$1.5 < |f11/fw| < 3.0 \quad (2')$$

According to the fourth aspect, in the zoom lens described in any one of the first to third aspects, the third lens group is comprised of only a single lens which is located near the stop and has at least one aspherical surface.

Placing the third group near the stop and forming it by using a single lens having at least one aspherical surface makes it possible to effectively correct spherical aberration and coma with a smaller number of lenses.

According to the fifth aspect, in the zoom lens described in any one of the first to fourth aspects, the fourth lens group sequentially comprises, a positive lens, negative lens, and positive lens along the optical axis from the object (to be imaged) side.

Since the fourth lens group, which has a relatively strong imaging function among the respective lens groups, has a so-called triplet type arrangement sequentially comprising a positive lens, negative lens, and positive lens along the optical axis from the object (to be imaged) side, spherical aberration, coma, curvature of field, and chromatic aberration can be effectively corrected.

According to the sixth aspect, in the zoom lens described in the fifth aspect, the fourth lens group is comprised of a cemented lens formed by cementing three lenses.

Since the fourth lens is comprised of the cemented lenses forming by cementing three lenses, the occurrence of chromatic aberration in the fourth lens group can be suppressed. In addition, since the fourth lens group is comprised of only one cemented lens, there is no need to adjust the positions of the respective lenses in the fourth lens group. This makes it possible to easily manufacture the zoom lens and hence achieve high productivity.

According to the seventh aspect, in the zoom lens described in any one of the first to fourth aspects, the fourth lens group is comprised of a cemented lens formed by sequentially cementing a positive lens, positive lens, and negative lens along the optical axis from the object (to be imaged) side.

Since the fourth lens group, which has a relatively strong imaging function among the respective lens groups, includes the cemented lens formed by sequentially cementing a positive lens, positive lens, and negative lens along the optical axis from the object (to be imaged) side, positive refracting power can be assigned to the lenses, the occurrence of spherical aberration, coma, and curvature of field can be suppressed.

According to the eighth aspect, in the zoom lens described in any one of the first to seventh aspects, a surface of the fourth lens group which is located nearest to the image side has as its concave surface facing the image side on the optical axis and has an aspherical surface shape.

Forming the surface of the fourth lens group which is located nearest to the image side into the aspherical surface shape makes it possible to effectively correct curvature of field and distortion, in particular.

According to the ninth aspect, in the zoom lens described in any one of the first to eighth aspects, the second lens group is sequentially comprised of one negative lens and a cemented lens formed by cementing a negative lens and positive lens along the optical axis from the object (to be imaged) side.

Since the second lens group is sequentially comprised of one negative lens and the cemented lens formed by cementing the negative lens and positive lens along the optical axis from the object (to be imaged) side, chromatic aberration of magnification can be mainly effectively corrected.

According to the 10th aspect, in the zoom lens described in any one of the first to eighth aspects, the second lens group is comprised of only a cemented lens formed by sequentially cementing a negative lens and positive lens along the optical axis from the object (to be imaged) side.

Since the second lens group is comprised of only the cemented lens formed by sequentially cementing the negative lens and positive lens along the optical axis from the object (to be imaged) side, the thickness of the second lens group in the optical axis direction can be decreased, and hence the moving amount of the second lens group can be ensured to be large. This allows the second lens group to have weaker refracting power and hence makes it possible to suppress the occurrence of aberration in the second lens group.

According to the 11th aspect, in the zoom lens described in the first to 10th aspects, the optical element having the effect of bending the optical path of a light beam is a reflecting optical element which reflects a light beam.

According to the 12th aspect, in the zoom lens described in the 11th aspect, the reflecting optical element comprises a prism for bending the optical path, and satisfies the following conditional expression:

$$ndp > 1.6 \quad (3)$$

where ndp is the refractive index of the prism with respect to a d line.

Since the reflecting optical element is comprised of the prism, the diameter of a light beam passing through the prism is decreased by refraction on the incident surface of the prism. This makes it possible to make the prism compact and hence to decrease the thickness of the image sensing apparatus equipped with the zoom lens in the thickness direction. Note that in this specification, the "thickness direction of the image sensing apparatus" means the same direction as the optical axis direction of the incident surface of the reflecting optical element of the first lens group.

Conditional expression (3) is an expression which defines the range of the refractive index of the material of the prism. Setting ndp to a value exceeding the lower limit of conditional expression (3) decreases the diameter of a light beam passing through the prism. This makes it possible to make the prism compact and hence to decrease the thickness of the image sensing apparatus in the thickness direction.

The range defined by conditional expression (3') given below is preferably satisfied because the above effect is enhanced:

$$ndp > 1.85 \quad (3')$$

According to the 13th aspect, there is provided an image sensing apparatus characterized by being equipped with the zoom lens described in any one of the first to 11th aspects.

This makes it possible to obtain a compact image sensing apparatus.

What is claimed is:

1. A zoom lens sequentially comprising, along an optical axis from an object to be imaged:
   a first lens group which has positive refracting power and is always fixed at a position in an optical axis direction in zooming and focusing;
   a second lens group having negative refracting power;
   a third lens group having positive refracting power; and
   a fourth lens group having positive refracting power, said fourth lens group sequentially comprising a positive lens, negative lens, and positive lens along the optical axis from the object to be imaged;
   wherein zooming is performed by moving at least said second lens group and said fourth lens group, focusing is performed by moving at least said fourth lens group, and said first lens group includes an optical element having an effect of bending an optical path of a light beam and satisfies the following conditional expression:

$$2.0 < f1/fw < 4.5$$

where f1 is a focal length of said first lens group and fw is a focal length of said zoom lens at a wide-angle end.

2. The lens according to claim 1, wherein the position of said third lens group is always fixed in the optical axis direction in zooming and focusing.

3. The lens according to claim 1, wherein said first lens group sequentially comprises, along the optical axis from the object to be imaged, a 1-1st lens having negative refracting power, a reflecting optical element for bending an optical path, and a 1-2nd lens having positive refracting power, and satisfies the following conditional expression:

$$1.1 < |f11|/fwK < 5.0$$

where f11 is a focal length of said 1-1st lens, and fw is a focal length of said zoom lens at the wide-angle end.

4. The lens according to claim 1, wherein said third lens group comprises only a single lens which is located near a stop and has at least one surface with an aspherical surface shape.

5. The lens according to claim 1, wherein said fourth lens group comprises a cemented lens formed by cementing three lenses.

6. The lens according to claim 1, wherein a surface of said fourth lens group which is located nearest to an image side has a concave surface facing the image side on the optical axis and has an aspherical surface shape.

7. The lens according to claim 1, wherein said second lens group sequentially comprises one negative lens and a cemented lens formed by cementing the negative lens and positive lens along the optical axis from the object to be imaged.

8. The lens according to claim 1, wherein the optical element having the effect of bending the optical path of the light beam is a reflecting optical element which reflects a light beam.

9. The lens according to claim 8, wherein said reflecting optical element comprises a prism for bending an optical path and satisfies the following conditional expression:

$$ndp > 1.6$$

where ndp is a refractive index of said prism with respect to a d line.

10. An image sensing apparatus equipped with a zoom lens defined in claim 1.

11. A zoom lens sequentially comprising, along an optical axis from an object to be imaged:

a first lens group which has positive refracting power and is always fixed at a position in an optical axis direction in zooming and focusing;

a second lens group having negative refracting power;

a third lens group having positive refracting power; and     a fourth lens group having positive refracting power, said fourth lens group sequentially comprising a positive lens and a cemented lens formed by cementing a positive lens and negative lens along the optical axis from the object to be imaged;

wherein zooming is performed by moving at least said second lens group and said fourth lens group, focusing is performed by moving at least said fourth lens group, and said first lens group includes an optical element having an effect of bending an optical path of a light beam and satisfies the following conditional expression:

$$2.0 < f1/fw < 4.5$$

where f1 is a focal length of said first lens group and fw is a focal length of said zoom lens at a wide-angle end.

12. An image sensing apparatus equipped with a zoom lens defined in claim 11.

13. A zoom lens sequentially comprising, along an optical axis from an object to be imaged:

a first lens group which has positive refracting power and is always fixed at a position in an optical axis direction in zooming and focusing;

a second lens group having negative refracting power, said second lens group comprising only a cemented lens formed by sequentially cementing a negative lens and a positive lens along the optical axis from the object to be imaged;

a third lens group having positive refracting power; and     a fourth lens group having positive refracting power;

wherein zooming is performed by moving at least said second lens group and said fourth lens group, focusing is performed by moving at least said fourth lens group, and said first lens group includes an optical element having an effect of bending an optical path of a light beam and satisfies the following conditional expression:

$$2.0 < f1/fw < 4.5$$

where f1 is a focal length of said first lens group and fw is a focal length of said zoom lens at a wide-angle end.

14. An image sensing apparatus equipped with a zoom lens defined in claim 13.

* * * * *